March 31, 1959     W. A. PAPWORTH     2,879,815
PORTABLE POWER DRIVEN RECIPROCABLE CUTTING TOOL
Filed June 13, 1956     2 Sheets-Sheet 1
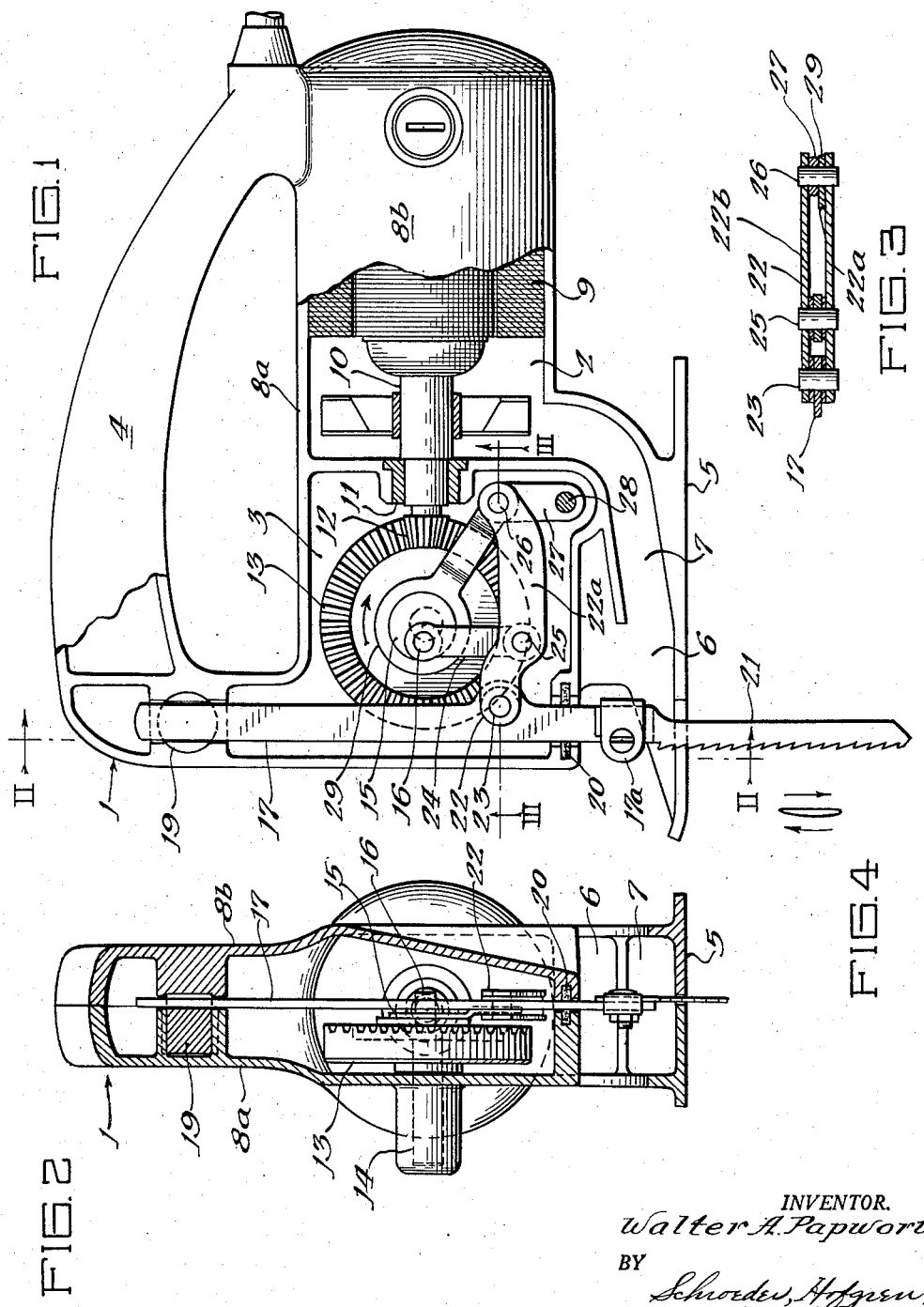
INVENTOR.
Walter A. Papworth
BY
Schroeder, Hofgren,
Brady & Wegner
Attorneys

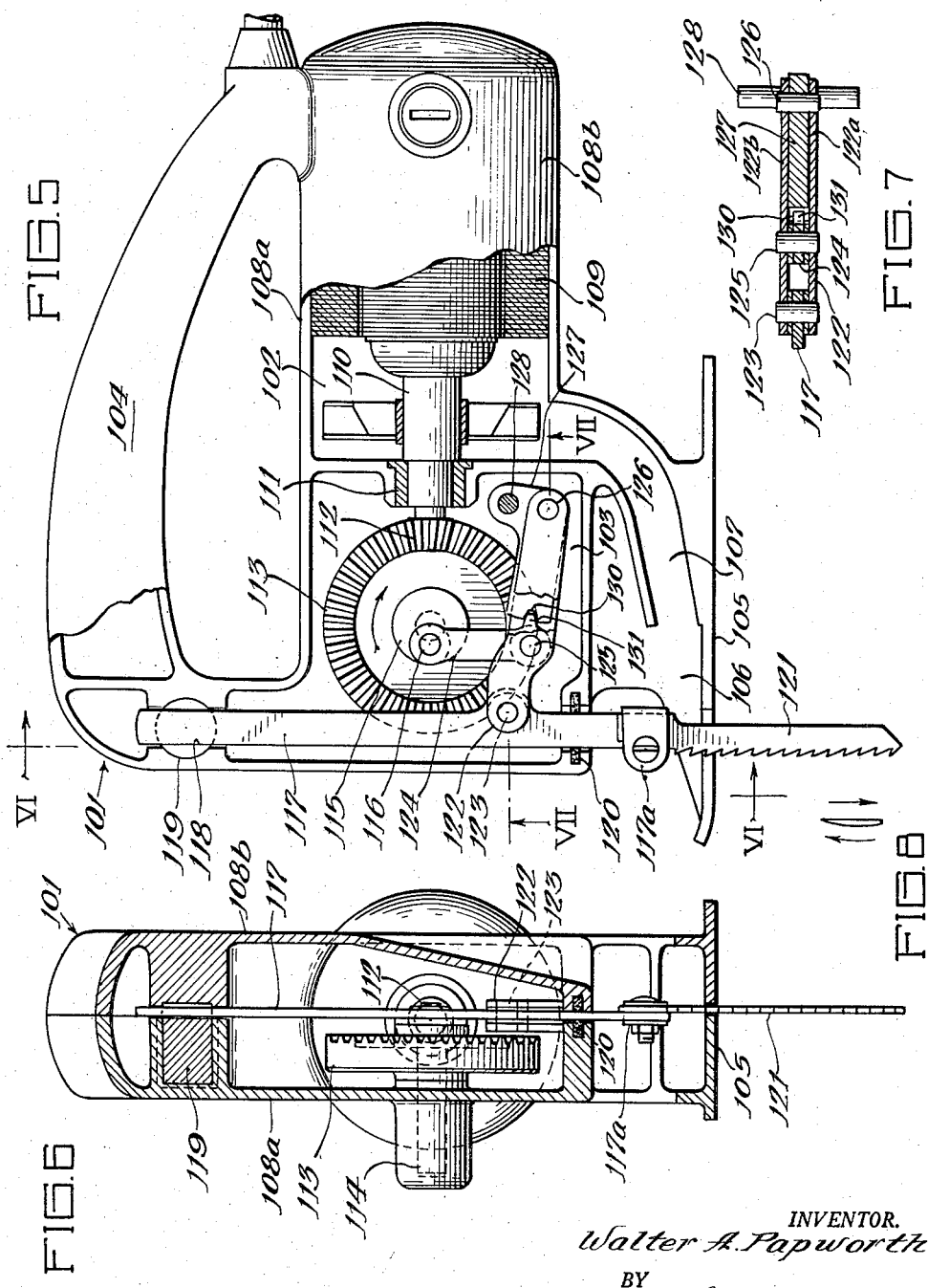

2,879,815

PORTABLE POWER DRIVEN RECIPROCABLE CUTTING TOOL

Walter A. Papworth, Syracuse, N.Y.

Application June 13, 1956, Serial No. 591,184

5 Claims. (Cl. 143—68)

This invention relates to a manually portable power driven reciprocable cutting tool, and in particular it relates to a bayonet saw which is provided with a simple mechanism for moving a saw blade in a modified slender oval orbit which is convex on one side and substantially straight on the other side.

The principal object of this invention is to provide a tool of this nature which is effective, simple, and low in cost.

A further object of the invention is to provide such a tool in which movements for both the major and minor dimensions of the oval are imparted to a tool plunger at one pivot point within an enclosed gear case as close as possible to the cutting point, and in which the minor movement may be as small a fraction as desired of the major movement.

A further object is to provide such a tool in which the distance between the fulcrum point and power application point on the tool plunger is as large as possible consistent with both points being enclosed in the gear case, and consistent with height limitations.

The invention is illustrated in the accompanying drawings, in which:

Fig. 1 is a left side view of a first form of tool embodying the invention, with part of the frame cut away to show the mechanism;

Fig. 2 is a section at II—II of Fig. 1, and showing internal parts as viewed from the front;

Fig. 3 is a fragmentary section of the lever portion of the tool, taken as indicated along the line III—III of Fig. 1;

Fig. 4 is a diagram showing the modified oval shape of the path of movement of the saw teeth;

Fig. 5 is a view like Fig. 1, showing a second embodiment of the invention;

Fig. 6 is a section taken as indicated along the line VI—VI of Fig. 5, showing internal parts as viewed from the front;

Fig. 7 is a fragmentary section of the lever portion of the second embodiment, taken as indicated along the line VII—VII of Fig. 5; and Fig. 8 is a diagram showing the modified oval shape of the path of movement of the saw teeth in the second embodiment.

Referring to the drawings in greater detail, and referring first to Figs. 1 to 4, in this embodiment of the invention, a frame indicated generally at 1 includes a motor housing 2, a gear case 3, a handle 4, a foot plate 5 which normally supports the tool upon the work, and a cavity 6 above the foot plate containing an air blast duct 7. As illustrated, the frame is made of two mating side members 8a and 8b abutting on the center plane C—C of Fig. 2; but other structure may be used.

A motor 9 has its shaft 10 journalled in bearings 11 mounted in a wall of the gear case. A pinion 12 on the motor shaft meshes with a gear 13 mounted on a shaft 14 journalled in the frame. The gear is provided with a very slightly eccentric crank disc 15 and a crank pin 16 extending therefrom.

A tool plunger 17 is slidably supported by a groove 18 in a rocker plug 19 which is pivotally mounted in the frame on an axis parallel to that of gear 13, so that it may have both lengthwise and arcuate movement, and extends through a slotted guide 20 in the bottom of the casing. A tool clamp 17a at the lower end of the tool plunger 17 is adapted to receive a cutting tool such as a saw blade 21 which has forwardly facing teeth.

A bifurcated lever 22 has its arms 22a and 22b flanking the tool plunger to which it is pivoted at 23, and extends rearwardly in the bottom portion of the gear case substantially normal to the tool plunger. A first connecting rod 24 is journalled at its upper end on the crank pin 16, and at its lower end between the arms of the lever 22 on a pivot 25.

The rear end of lever 22 is pivoted at 26 to a link 27, which is pivoted to the frame at 28. A connecting rod 29 is journalled at its upper end on the eccentric crank disc 15, and at its lower end on the pivot 26 of link 25, between the arms of lever 22. When the gear is rotated, the connecting rod 24 moves the tool plunger 17 lengthwise, and the connecting rod 29 moves the pivot 26 and the lever 22 in a direction perpendicular to the tool plunger, imparting a modified elliptical movement of the tool plunger and cutting tool, the width of the ellipse being controlled by the amount of eccentricity provided in the eccentric 15. The movement of the lever is effectively in the plane of the cutting tool.

In the embodiment of the invention shown in Figs. 5 to 8, the same result is accomplished by slightly different means. All the elements of the device of Figs. 5 to 8 are identical with the elements of the first embodiment except for the tool plunger drive linkage, so the elements are merely numbered in the drawings with numerals 100 higher than those used in Figs. 1 to 3, and are not described in detail.

The first element which differs structurally is a bifurcated lever 122 having arms 122a and 122b flanking the tool plunger 117 to which it is pivoted at 123, and from which it extends rearwardly substantially normal to the tool plunger. A connecting rod 124 is journalled at its upper end on the crank pin 116, and at its lower end between the arms of lever 122 on a pivot 125. The rear end of lever 122 is carried on a pivot 126 which also carries between the arms of the lever a bell crank 127. An upwardly extending arm of the bell crank is pivoted to the frame at 128, while the other arm of the bell crank extends forwardly and is provided with a cam notch 130 which meshes with a cam lug 131 on the lower end of connecting rod 124.

When the gear 113 is rotated, the connecting rod 124 moves the tool plunger 117 lengthwise, and the angular movement of the connecting rod with respect to the lever 122, acting through the cam lug 131, and cam notch 130, imparts a rocking movement to the bell crank 127 with respect to the lever 122, whereby the lever is moved in a direction generally perpendicular to the tool plunger 117; and a modified elliptical movement is imparted to the tool plunger and cutting tool. The movement of the lever is effectively in the plane of the cutting tool. In the embodiment shown in the drawings, the cam notch 130 and cam lug 131 are of gear tooth form; and the pitch radius of the gear tooth plus the distance between the pivots 126 and 128 determines the width of the ellipse. By varying the cam formation from the illustrated gear tooth type, a range down to zero for the extension and retraction movement of the lever 122 may be provided.

In both variations the result is substantially the same. The levers 22 and 122 both have an arcuate movement resulting in a slight movement of the pivot 23, or 123, as the case may be, in a direction perpendicular to the tool plunger, this being the versed sine of the arc. When additional lengthwise bodily movement is imparted to the lever, that is superimposed on the versed sine movement. When the two movements are equal the versed sine movement is offset by the bodily movement, and the result is a substantially straight line down stroke of the tool. The modified elliptical motion is asymmetrical with respect to its major axis by reason of this combination of movements, and is asymmetrical with regard to its minor axis by reason of the varying radial distance from the rocker plug 19 or 119, so that the lower half of the ellipse is wider than the upper half, and wider near the end of the cutting tool than near the base of the machine.

Both of these distortions are beneficial. The straight line return requires less clearance in cutting to a tight curve than an arcuate return, and is equivalent to using a narrower blade. And in cutting thick material the end of the blade has some tendency to deflect backward, which is countered by the greater width of ellipse at that point.

The foregoing detailed description is given for clearness of understanding only and no unnecessary limitations are to be understood therefrom, as some modifications will be obvious to those skilled in the art.

I claim:

1. A power driven, reciprocable manually portable cutting tool comprising: a frame including a foot plate adapted to normally support the tool against the work; a motor in the frame, said motor having a shaft provided with a pinion; a gear journalled in the frame and meshing with said pinion; guide means pivotally mounted in the frame above the gear on an axis parallel to the gear; a tool plunger the upper end of which engages said guide means so that the tool plunger is guided for endwise and arcuate movement; a cutting tool secured to the lower end of said tool plunger; and a drive linkage for the tool plunger including a crank pin on the gear, a first connecting rod journalled on said crank pin and extending downwardly therefrom, an amplifying lever pivotally connected to said tool plunger at one end to the connecting rod between its ends, said lever being effectively in the plane of the cutting tool and substantially normal to the tool plunger, a guide link pivoted to the frame and to the other end of said amplifying lever, an eccentric on the gear, a second connecting rod journalled on said eccentric and pivotally connected to said link, said drive linkage and said guide means being proportioned and cooperating to move the cutting tool in a modified elliptical orbit whose lower half is wider than its upper half and whose cutting stroke is more convex than its returning stroke.

2. A power driven, reciprocable manually portable cutting tool comprising: a frame, including a foot plate adapted to normally support the tool upon the work; a motor in said frame, said motor having a shaft provided with a pinion; a gear journalled in the frame and meshing with said pinion; guide means pivotally mounted in the frame above the gear on an axis parallel to that of the gear; a tool plunger the upper end of which engages said guide means so that the tool plunger is guided for endwise and arcuate movement; a cutting tool secured to the lower end of the tool plunger; and a drive linkage for the tool plunger including a crank pin on the gear, a connecting rod journalled on said crank pin and extending downwardly therefrom, an amplifying lever pivotally connected to said tool plunger at one end and to the connecting rod between its ends, said lever being effectively in the plane of the cutting tool and substantially normal to the tool plunger, a bell crank pivoted to the frame and to the other end of said amplifying lever, said bell crank having an arm provided with a cam notch adjacent said connecting rod, and a cam lug on the connecting rod which meshes with said notch, said drive linkage and said guide means being proportioned and cooperating to move the cutting tool in a modified elliptical orbit whose lower half is wider than its upper half, and whose cutting stroke is more convex than its returning stroke.

3. A power driven, reciprocable manually portable cutting tool comprising: a frame, including a foot plate adapted to normally support the tool upon the work; a motor in said frame, said motor having a shaft provided with a pinion; a gear journalled in the frame and meshing with said pinion; guide means pivotally mounted in the frame above the gear on an axis parallel to that of the gear; a tool plunger the upper end of which engages said guide means so that the tool plunger is guided for endwise and arcuate movement; a cutting tool secured to the lower end of the tool plunger; and a drive linkage for the tool plunger including a crank pin on the gear, a connecting rod journalled on said crank pin and extending downwardly therefrom, an amplifying lever pivotally connected to said tool plunger at one end and to the connecting rod between its ends, said lever being effectively in the plane of the cutting tool and substantially normal to the tool plunger a bell crank pivoted to the frame and to the other end of said amplifying lever, said bell crank having an arm pivoted with a cam notch of gear tooth formation adjacent said connecting rod, and a cam lug of gear tooth formation on the connecting rod which meshes with said notch, said drive linkage and said guide means being proportioned and cooperating to move the cutting tool in a modified elliptical orbit whose lower half is wider than its upper half, and whose cutting stroke is more convex than its returning stroke.

4. A power driven, reciprocable manually portable cutting tool comprising: a frame; a motor in the frame; a gear journalled in the frame and operatively driven by the motor; eccentric means on the gear; guide means pivotally mounted in the frame on an axis parallel to that of the gear; a tool plunger one end portion of which is guided by said guide means for endwise and arcuate movement; a cutting tool secured to said tool plunger; and a drive linkage for said tool plunger, including a lever mounted in said frame for endwise and arcuate movement effectively in the plane of the cutting tool, said lever being substantially normal to, and pivotally connected at one end to said tool toward the end remote from the guide means plunger, a connecting rod journalled at one end on said eccentric means and pivotally connected at its other end to the middle portion of said lever and means having pivotal connection with the other end of said lever and operatively connected with the eccentric means to actuate said lever in an endwise direction, said drive linkage and said guide means being proportioned and cooperating to move the cutting tool in a slender modified oval path whose lower half is wider than its upper half and whose cutting stroke is more convex than its returning stroke.

5. A power driven, reciprocable manually portable cutting tool comprising: a frame; a motor in the frame; a gear journalled in the frame and operatively driven by the motor; eccentric means on the gear; guide means pivotally mounted in the frame on an axis parallel to that of the gear; a tool plunger one end portion of which is guided by said guide means for endwise and arcuate movement; a cutting tool secured to said tool plunger; and a drive linkage for said tool plunger, including a lever mounted in said frame for endwise and arcuate movement effectively in the plane of the cutting tool, said lever being substantially normal to, and pivotally connected at one end to said tool plunger toward the end remote from the guide means, a connecting rod journalled at one end on said eccentric means and pivotally connected at its other end to the middle portion of said lever, link means pivoted in the frame and having pivotal connection with the other end of said lever, and means actuated by said eccentric means and having operative engagement with said link means whereby said lever is actuated in an endwise direction, said drive linkage and said guide means being proportioned and cooperating to move the cutting tool in a slender modified oval path whose lower half is wider than its upper half and whose cutting stroke is more convex than its returning stroke.

References Cited in the file of this patent
UNITED STATES PATENTS

| Number | Name | Date |
|---|---|---|
| 3,287 | Marsh | Sept. 28, 1843 |
| 1,043,775 | Koons | Nov. 5, 1912 |
| 1,269,883 | Wardman | June 18, 1918 |
| 1,303,561 | Johnson | May 13, 1919 |
| 1,855,371 | Ungan | Apr. 26, 1932 |
| 2,619,133 | Vulliet-Durand | Nov. 25, 1952 |
| 2,705,980 | Papworth | Apr. 12, 1955 |
| 2,737,984 | Bruck | Mar. 13, 1956 |